L. L. GIBSON.
AUTOMOBILE LOCK.
APPLICATION FILED APR. 29, 1918. RENEWED DEC. 18, 1918.

1,296,382.

Patented Mar. 4, 1919.
2 SHEETS—SHEET 1.

Witness
E. R. Rupport
R. M. Smith

Inventor
L. L. Gibson
By Victor J. Evans
Attorney

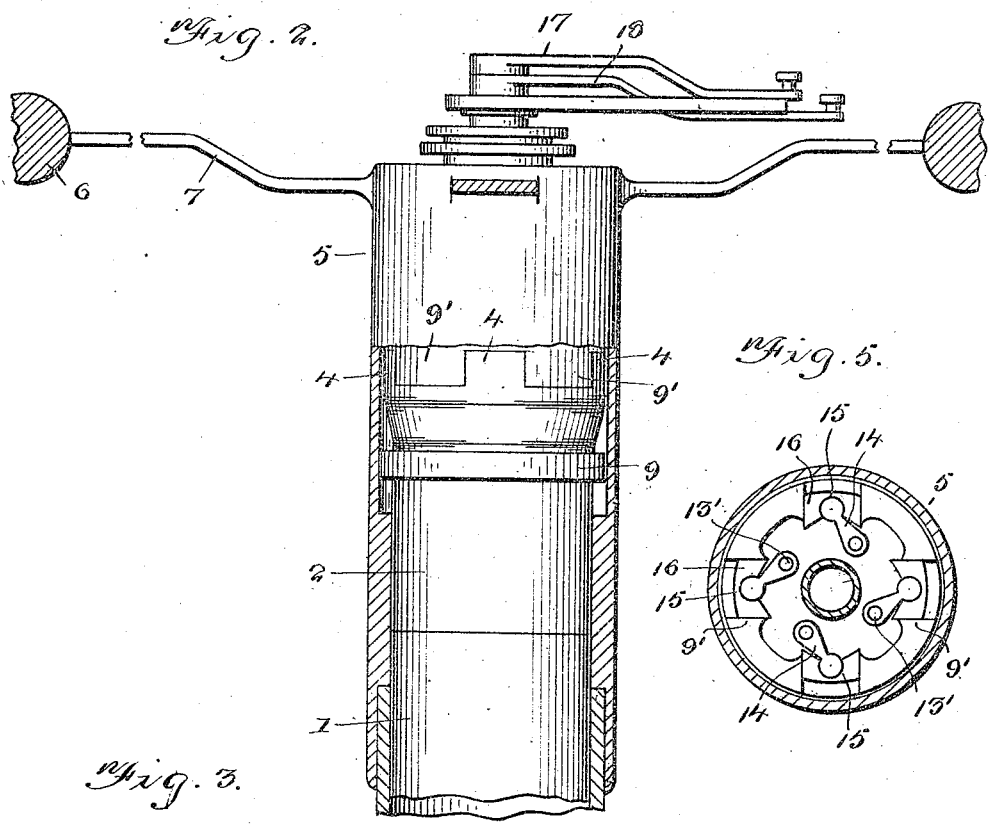
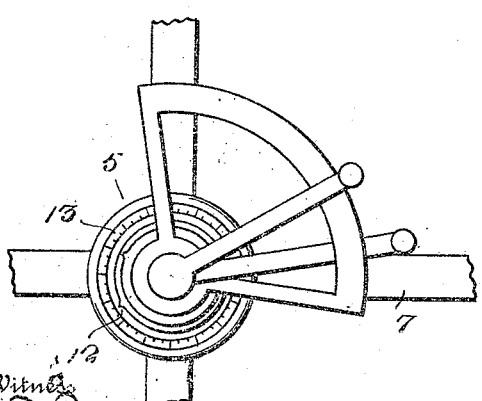
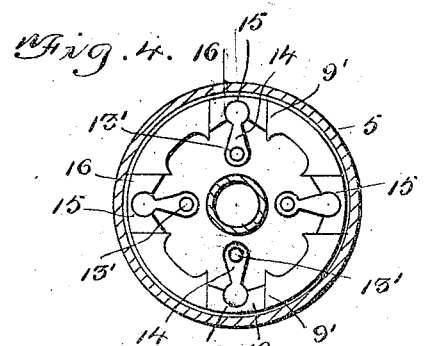

UNITED STATES PATENT OFFICE.

LEWIS L. GIBSON, OF MACON, GEORGIA.

AUTOMOBILE-LOCK.

1,296,382.  Specification of Letters Patent.  Patented Mar. 4, 1919.

Application filed April 25, 1916, Serial No. 231,441. Renewed December 18, 1918. Serial No. 267,406.

*To all whom it may concern:*

Be it known that I, LEWIS L. GIBSON, a citizen of the United States, residing at Macon, in the county of Bibb and State of Georgia, have invented new and useful Improvements in Automobile-Locks, of which the following is a specification.

This invention relates to automobile locks, the object of the invention being to provide simple and reliable permutation lock mechanism for the purpose of rendering the steering mechanism and cushioning elements of the engine controlling mechanism inoperative on the part of an unauthorized person, thereby preventing the operation of the car and its theft or removal. The lock mechanism is placed for convenient operation at the head of the steering column directly in front of the operator who may manipulate the lock while sitting in his seat in the machine.

With the above and other objects in view, the invention consists in the construction, combination and arrangement of parts, as herein described, illustrated and claimed.

In the accompanying drawings,

Fig. 2 is a similar view showing the same parts connected for operation.

Fig. 3 is a plan view of the steering wheel showing the spark and throttle controls and the master tumbler of the locking mechanism.

Fig. 4 is a cross sectional view illustrating the radially movable and slidable bolts.

Fig. 5 is a similar view with the bolts drawn inwardly.

Figure 1:
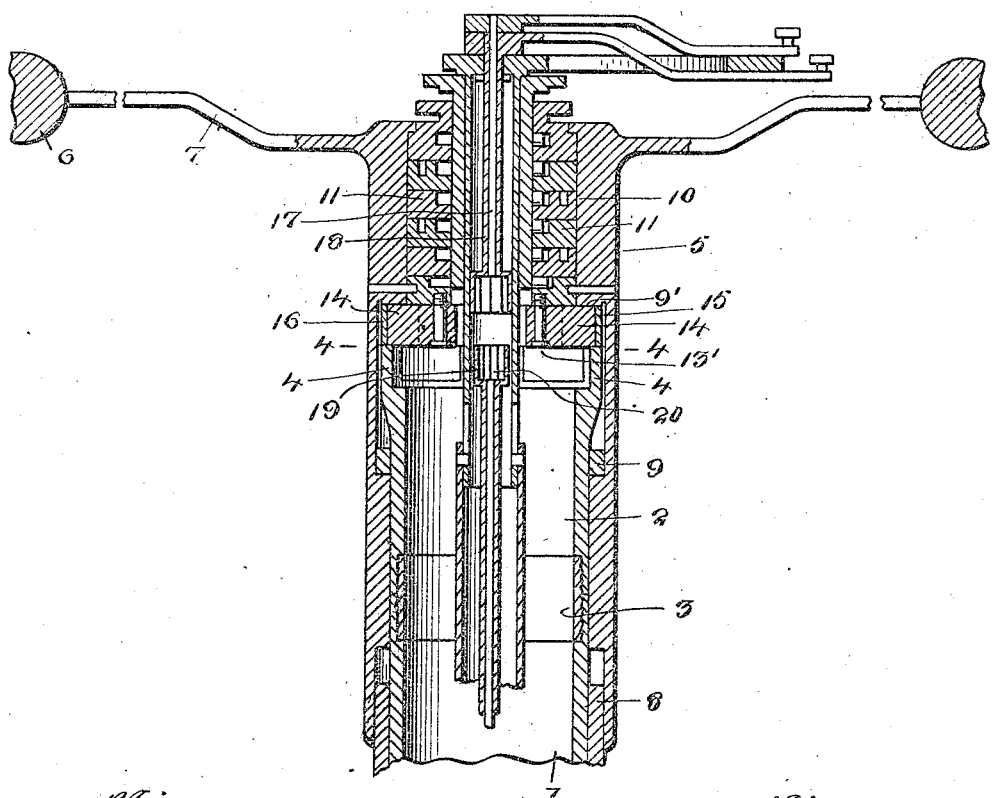
Figure 1 is a vertical longitudinal section through the upper part of a steering column of a motor vehicle, showing the two sections of the steering shaft disconnected.
Figure 6:
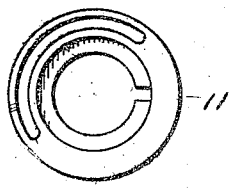
Figs. 6 and 7 are plan views of two of the tumblers.
Figure 7:
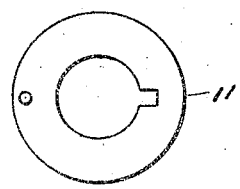

Referring to the drawings, 1 designates the tubular steering shaft, common to all steering mechanisms of motor vehicles in general.

In carrying out the present invention, in a car already in use, I remove a portion of the upper end part of the shaft 1 and substitute therefor a new section 2, connecting the same rigidly with the lower section 1 by means of a threaded union 3. The tubular section 2 is formed at its upper extremity with a circular series of tenons or projections 4, the purpose of which will appear. When the lock mechanism is to be applied to a motor vehicle at the time of manufacture thereof, the section 1 may be made of sufficient length to extend as far as the section 2 of the drawings, which is formed with the projections 4 at its upper extremity.

Mounted for sliding movement longitudinally upon the section 2 is a head section 5 to which the usual steering rim 6 is secured by spokes 7. The upward movement of the head section 5 is limited in relation to the lower section of the steering column by an annular stop rib 9 on the section 2. 8 represents the casing of the steering column. The head section is formed with internal tenons or projections 9' which are adapted to fit between the projections 4 above referred to so as to cause the sections of the steering shaft to rotate together for steering purposes. The head section 5 is formed with a cylindrical recess 10 and contains a number of disk shaped tumblers 11 superimposed one upon the other, the upper master tumbler having graduations 12 thereon to register with one or more graduations 13 on the inner hub portion of the steering wheel. The lower tumbler 11 is connected pivotally at 13' to a circular series of links 14 which are in turn pivotally connected at 15 to a corresponding series of radially slidable bolts or obstructions 16, the latter being slidable through the spaces between the projections 9' so as to fill said spaces and prevent any rotative engagement between the upper and lower sections of the steering shaft, thus preventing the steering of the machine. Before the machine may be adjusted for steering, it is necessary to lower the head section 5, and in order to do this, the tumblers 11 must be arranged by the person knowing the combination in order that the bolts or obstructions 16 may be drawn inwardly. Then the upper section 5 may be lowered so as to bring about an interfitting relation between the projections 4 and 5.

In further carrying out the invention, the throttle control tubular shaft 17 and the spark lead control shaft 18 passing therethrough are made in sections as shown in the drawings, the upper and lower sections of the shaft 17 having a slip joint connection at 19 and the sections of the shaft 18 having a slip joint connection at 20. The upper sections of said shafts 17 and 18 have a swivel and supporting connection in the head section, so that when the head section is raised to disconnect it from the lower section of the steering shaft, the sections of the shafts 17 and 18 are simultaneously disconnected. Therefore, an unauthorized person is neither able to turn the steering wheels of the machine nor is he able to control the engine by means of the shafts 17 and 18. This makes it impossible for an unauthorized person to operate the vehicle or remove the same to another place.

I claim:—

1. In steering mechanism, a tubular steering shaft comprising an upper section and a lower section, the upper section being movable longitudinally in relation to the lower section, interfitting projections on the adjacent ends of said upper and lower sections, lock mechanism housed within said upper section, and means controlled by said lock mechanism and movable into the recesses between said projections to prevent the downward or return movement of said upper section.

2. In steering mechanism, a tubular steering shaft comprising an upper section and a lower section, the upper section being movable longitudinally in relation to the lower section, interfitting projections on the adjacent ends of said upper and lower sections, lock mechanism housed within said upper section, means controlled by said lock mechanism and movable into the recesses between said projections to prevent the downward or return movement of said upper section, and engine controlling shafts passing through the sections of said steering shaft and each made in sections, the sections of each controlling shaft having a slip joint and detachable connection with each other.

3. In steering mechanism, a tubular steering shaft comprising an upper section and a lower section, the upper section being movable longitudinally in relation to the lower section, interfitting projections on the adjacent ends of said upper and lower sections, lock mechanism housed within said upper section, means controlled by said lock mechanism and movable into the recesses between said projections to prevent the downward or return movement of said upper section, and said means comprising a series of radially movable bolts operatively connected with an adjacent member of the lock mechanism.

4. In steering mechanism, a tubular steering shaft, comprising an upper section and a lower section, the upper section being movable longitudinally in relation to the lower section, interfitting projections on the adjacent ends of said upper and lower sections, lock mechanism housed within said upper section, means controlled by said lock mechanism and movable into the recesses between said projections to prevent the downward or return movement of said upper section, and means for limiting the upward movement of said upper section.

In testimony whereof I affix my signature.

LEWIS L. GIBSON.